United States Patent Office 2,815,381
Patented Dec. 3, 1957

2,815,381

ALKYL SUBSTITUTED HYDRINDACENONES

Marion S. Carpenter, Nutley, William M. Easter, Jr., Hasbrouck Heights, and Thomas F. Wood, Little Falls, N. J., assignors to The Givaudan Corporation, New York, N. Y., a corporation of New Jersey No Drawing. Application May 10, 1955, Serial No. 507,504

5 Claims. (Cl. 260—590)

This invention relates to novel chemical compounds and more especially to alkyl-substituted hydrindacenones having musk-like odors.

Most of the known synthetic musk-like compounds fall into two classes: (1) nitrated aromatic hydrocarbons, such as musk xylene, and (2) macrocyclic ketones, lactones or esters, such as cyclopentadecanone, cyclopentadecanolide and ethylene brassylate. While members in the first group are inexpensive to manufacture, they suffer from the disadvantage that they are not light-stable or alkali-stable, frequently causing discoloration in products such as soap. Members of the second group, while reasonably stable to light and alkali, are difficult to manufacture and are relatively costly.

We have found that alkyl-substituted hydrindacenones possess musk-like odors, are light-stable and alkali-stable and are relatively inexpensive to manufacture.

In general, our novel musk-like compounds are prepared in three steps: (1) preparation of suitable alkyl-substituted indans, (2) condensation of the latter with β-chloropropionyl chloride to the corresponding β-chloroethyl ketones and (3) cyclization of the latter with elimination of hydrogen chloride to produce the desired alkyl-substituted hydrindacenones.

Examples of specific compounds we have prepared include 5,5,7,7-tetramethyl s-hydrindacen-1-one, 4,6,6,8,8-pentamethyl as-hydrindacen-3-one, 4,6,6,7,8,8-hexamethyl as-hydrindacen-3-one, and 4,6,6,7,7,8,8-heptamethyl as-hydrindacen-3-one.

The following examples are given in order more fully to illustrate this invention without, however, limiting the same to them.

EXAMPLE 1

*Preparation of 5,5,7,7-tetramethyl s-hydrindacen-1-one*

An ether solution of 132 g. of 4-methyl 4-phenyl pentan-2-one was added with agitation to an ether solution of methyl magnesium iodide prepared from 116 g. of methyl iodide and 20 g. of magnesium shavings. The reaction mixture was quenched on iced dilute hydrochloric acid and the ether solution was washed to neutrality and distilled to yield 118 g. of 2,4-dimethyl 4-phenyl pentan-2-ol as a colorless oil boiling at 83° C./1 mm. Hg and having Sp. Gr. (25° C.) 0.9590 and $n_D^{20}$ 1.5152.

To 200 g. of 93% sulfuric acid previously cooled to 0° C. there was added with agitation during one hour 110 g. of the above 2,4-dimethyl 4-phenyl pentan-2-ol, maintaining the temperature at 0° C. to 2° C. by cooling. The reaction mixture was quenched on ice and the oil layer was separated, washed to neutrality and distilled to yield 91 g. of 1,1,3,3-tetramethylindan, as a colorless oil congealing at 16° C., boiling at 47° C./1.5 mm. Hg and having Sp. Gr. (25° C.) 0.8966 and $n_D^{20}$ 1.5023.

A solution of 20 g. of the above 1,1,3,3-tetramethylindan and 16 g. of β-chloropropionyl chloride was added with agitation to a suspension of 19 g. of anhydrous aluminum chloride in 100 g. of ethylene dichloride, keeping the temperature at 25–30° C. When hydrogen chloride evolution had ceased the reaction mixture was quenched on ice and the ethylene dichloride solution was washed to neutrality and the solvent was evaporated, leaving 30 g. of crude β-chloroethyl 1,1,3,3-tetramethylindan-5-yl ketone as a yellow oil. The latter was added to 480 g. of 93% sulfuric acid and the mixture was agitated while heating to 60° C. When hydrogen chloride evolution had subsided the reaction mixture was quenched on ice, extracted with benzene and the benzene solution was washed to neutrality and distilled to yield 15 g. of 5,5,7,7-tetramethyl s-hydrindacen-1-one, having boiling point 138–140° C./2 mm. Hg, melting point about 100° C., and having a musk-like odor.

EXAMPLE 2

*Preparation of 4,6,6,8,8-pentamethyl as-hydrindacen-3-one*

To 250 g. of 93% sulfuric acid, cooled to −5° C. there was added, with agitation, 720 g. of p-cymene at such a rate as to maintain the temperature of the mixture at 0° C. or lower. Then, with continued agitation, there was fed in during 3.5 hrs. 91 liters of isobutene, keeping the temperature between −5° C. and 5° C. Agitation was continued 20 minutes further, the reaction mixture was allowed to settle, the lower acid layer was removed and the upper layer was washed to neutrality and distilled. Isobutane distilled off first as a gas. Vacuum was then applied and there was collected, in addition to 403 g. of p-cymene, 259 g. of 1,1,3,3,5-pentamethylindan, boiling at 76–78° C./5 mm. Hg and having Sp. Gr. (25° C.) 0.8940.

An alternate synthesis of the above 1,1,3,3,5-pentamethylindan is as follows: To a mixture of 200 g. of anhydrous aluminum chloride and 600 g. of toluene there was added, with agitation, 98 g. of mesityl oxide during one hour at 10° C. Agitation was continued 4 hours further at 10° C. and the reaction mixture was quenched on ice. The toluene solution was washed to neutrality with water and distilled. There was obtained, in addition to the excess of toluene, 130 g. of 4-methyl 4-p-tolyl pentan-2-one, boiling at 90–92° C./2 mm. Hg. An ether solution of 95 g. of 4-methyl 4-p-tolyl pentan-2-one was added with agitation to an ether solution of methyl magnesium iodide prepared from 71 g. of methyl iodide and 12 g. of magnesium shavings. The reaction mixture was quenched on iced dilute hydrochloric acid and the ether solution was washed to neutrality and distilled to yield 66 g. of 2,4-dimethyl 4-p-tolyl pentan-2-ol, boiling at 92–94° C./1.5 mm. Hg. To 120 g. of 93% sulfuric acid previously cooled to 5° C. there was added with agitation during 30 minutes 65 g. of the above 2,4-dimethyl 4-p-tolyl pentan-2-ol, keeping the temperature at 5° C. by cooling. The reaction mixture was quenched on ice and the oil layer was separated, washed to neutrality and distilled to yield 45 g. of 1,1,3,3,5-pentamethylindan identical with that prepared from p-cymene and isobutene.

A solution of 37.6 g. of the above 1,1,3,3,5-pentamethylindan and 27 g. of β-chloropropionyl chloride was added with agitation to a suspension of 32 g. of anhydrous aluminum chloride in 150 g. of ethylene dichloride, keeping the temperature at 25–30° C. When hydrogen chloride evolution had ceased the reaction mixture was quenched on ice and the ethylene dichloride solution was washed to neutrality and the solvent was evaporated, leaving 53 g. of crude β-chloroethyl 1,1,3,3,5-pentamethylindan-6-yl ketone as an amber-colored oil. The latter was added to 850 g. of 93% sulfuric acid and the mixture was agitated while heating to 80° C. When hydrogen chloride evolution had subsided the reaction mixture was quenched on ice, extracted with benzene and the benzene extract was washed to neutrality. After evaporation of the benzene there remained 36 g. of crude crystals which, after crystallization from alcohol, yielded 24 g. of 4,6,6,8,8-pentamethyl as-hydrindacen-3-one as colorless crystals melting at 91–92° C. and having a musk-like odor.

EXAMPLE 3

*Preparation of 4,6,6,7,8,8-hexamethyl as-hydrindacen-3-one*

To 1,200 g. of 93% sulfuric acid, cooled to −5° C., there was added, with agitation, 480 g. of p-cymene at such a rate as to maintain the temperature of the mixture at 0° C. or lower. Then, with continued agitation, there was fed in during one hour 120 g. of dimethyl ethyl carbinol, keeping the temperature at −4° C. to 0° C. Agitation was continued 30 minutes further, the reaction mixture was allowed to settle, the lower acid layer was removed and the upper layer was washed to neutrality and distilled. Isopentane distilled off first. Vacuum was then applied and there was collected, in addition to 340 g. of p-cymene, 100 g. of 1,1,2,3,3,5-hexamethylindan probably containing some of the isomeric 1,1,2,2,3,5-hexamethylindan boiling at 72–78° C./1.5 mm. Hg and having Sp. Gr. (25° C.) 0.902.

A solution of 60 g. of the above hexamethylindan mixture and 40.5 g. of β-chloropropionyl chloride was added with agitation to a suspension of 48 g. of anhydrous aluminum chloride in 250 g. of ethylene dichloride, keeping the temperature at 25–30° C. When hydrogen chloride evolution had ceased the reaction mixture was quenched on ice, the ethylene dichloride solution was washed to neutrality and the solvent was evaporated, leaving 85 g. of the corresponding crude β-chloroethyl ketone as a reddish oil. The latter was added to 1,300 g. of 93% sulfuric acid and the mixture was agitated while heating to 75° C. When hydrogen chloride evolution had subsided the reaction mixture was quenched on ice, extracted with benzene and the benzene extract was washed to neutrality and distilled to yield 34 g. of 4,6,6,7,8,8-hexamethyl as-hydrindacen-3-one, probably containing some of the isomeric 4,6,7,7,8,8-hexamethyl as-hydrindacen-3-one, as a colorless viscous oil boiling at 155–160° C./2 mm. Hg, and having a musk-like odor.

EXAMPLE 4

*Preparation of 4,6,6,7,7,8,8-heptamethyl as-hydrindacen-3-one*

To 1,060 g. of 93% sulfuric acid, cooled to −5° C., there was added, with agitation, 420 g. of p-cymene at such a rate as to maintain the temperature of the mixture at 0° C. or lower. Then, with continued agitation, there was fed in during one hour 180 g. of 2,3-dimethylbutan-2-ol, keeping the temperature at −3° C. to 0° C. Agitation was continued 15 minutes further, the reaction mixture was allowed to settle, the lower acid layer was removed and the upper layer was washed to neutrality and distilled. 2,3-dimethyl butane distilled off first. Vacuum was then applied and there was collected, in addition to 270 g. of p-cymene, 122 g. of 1,1,2,2,3,3,5-heptamethylindan boiling at 113° C./3 mm. Hg and melting, after crystallization from alcohol, at 65–66° C.

A solution of 43.2 g. of 1,1,2,2,3,3,5-heptamethylindan and 27 g. of β-chloropropionyl chloride was added with agitation to a suspension of 32 g. of anhydrous aluminum chloride in 200 g. of ethylene dichloride, keeping the temperature at 25–30° C. The reaction mixture was worked up as in the previous examples and yielded 59 g. of the corresponding crude β-chloroethyl ketone. The latter was cyclized by heating with 860 g. of 93% sulfuric acid to 75° C. and worked up as in the previous examples. Crystallization of the crude product yielded 20 g. of 4,6,6,7,7,8,8-heptamethyl as-hydrindacen-3-one as colorless crystals melting at 102–103° C. and having a musk-like odor.

The foregoing illustrates the practice of the invention, which however is to be contrued as broadly as permissible in view of the prior art and limited solely by the appended claims.

We claim:

1. Alkyl-substituted hydrindacenones selected from the group consisting of as-hydrindacene-3-ones and s-hydrindacene-1-ones having lower alkyl substituents in the non-keto five-membered ring so as to yield at least one quaternary carbon atom in said ring.
2. 5,5,7,7-tetramethyl-s-hydrindacen-1-one.
3. 4,6,6,8,8-pentamethyl-as-hydrindacen-3-one.
4. 4,6,6,7,8,8-hexamethyl-as-hydrindacen-3-one.
5. 4,6,6,7,7,8,8-heptamethyl-as-hydrindacen-3-one.

References Cited in the file of this patent

Arnold et al.: J. Am. Chem. Soc., vol. 67, pgs. 1265–67 (1945).